(12) United States Patent
Offeman et al.

(10) Patent No.: US 7,341,663 B2
(45) Date of Patent: Mar. 11, 2008

(54) SPIRAL-WOUND LIQUID MEMBRANE MODULE FOR SEPARATION OF FLUIDS AND GASES

(75) Inventors: Richard D. Offeman, Pinole, CA (US); George H. Robertson, Danville, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 270 days.

(21) Appl. No.: 11/016,064

(22) Filed: Dec. 16, 2004

(65) Prior Publication Data

US 2006/0131235 A1    Jun. 22, 2006

(51) Int. Cl.
| | |
|---|---|
| B01D 63/10 | (2006.01) |
| B01D 63/12 | (2006.01) |
| B01D 61/36 | (2006.01) |
| B01D 61/38 | (2006.01) |
| B01D 61/00 | (2006.01) |

(52) U.S. Cl. ............... 210/321.76; 210/640; 210/641; 210/650; 210/651; 210/652; 210/321.6; 210/321.74; 210/321.83; 210/321.85

(58) Field of Classification Search ............ None
See application file for complete search history.

(56) References Cited

U.S. PATENT DOCUMENTS

| | | | |
|---|---|---|---|
| 4,756,835 A | | 7/1988 | Wilson |
| 5,034,126 A | * | 7/1991 | Reddy et al. ........ 210/321.74 |
| 5,069,793 A | * | 12/1991 | Kaschemekat et al. ..... 210/640 |
| 5,580,452 A | | 12/1996 | Lin |
| 5,637,224 A | | 6/1997 | Sirkar et al. |
| 5,858,229 A | | 1/1999 | Uemura et al. |
| 6,117,328 A | | 9/2000 | Sikdar et al. |
| 6,649,062 B1 | | 11/2003 | Petty |
| 2004/0178147 A1 | * | 9/2004 | Fanselow et al. ........... 210/644 |

OTHER PUBLICATIONS

Christen, P., M. Minier and H. Renon, "Ethanol Extraction by Supported Liquid Membrane During Fermentation," (1990) Biotechnology and Bioengineering 36:116-123.
Matsumura, M., S. Takehara, and H. Kataoka, "Continuous Butanol/Isopropanol Fermentation in Down-Flow Column Reactor Coupled with Pervaporation Using Supported Liquid Membrane," (1992) Biotechnology and Bioengineering 39:148-156.
Qin, Y., J.P. Sheth, and K.K. Sirkar, "Supported Liquid Membrane-Based Pervaporation for VOC Removal," (2002) Ind. Eng. Chem. Res. 41:3413-3428.
Baker, R.W., "Membrane Technology and Applications," 2nd Edition (2004) John Wiley & Sons Ltd, England p. 145-153.
Itoh, T., Ohkawa, Y., Ishihara, K. and Shinohara, I., "Permselectivity of Liquid-Polymer Hybrid Membrane Composed of Carbon Tetrachloride and 2-Hydroxyethyl Acrylate-Acrylonitrile Graft Copolymner for Ethanol-Water Mixture,"(1983) Polymer J. 15(11):827-837.

* cited by examiner

Primary Examiner—Krishnan S. Menon
(74) Attorney, Agent, or Firm—Howard V. Owens; David R. Nicholson; John D. Fado (57) ABSTRACT

The present invention is a filtering and chemical separation device that performs the operations of solvent extraction and pervaporation in a single piece of equipment, configured as a spiral-wound membrane module, and provides for the replenishment of the solvent in the supported liquid membrane while the module continues in operation. It provides a solution to the problem of separating miscible compounds efficiently and with low energy requirements.

17 Claims, 5 Drawing Sheets

SPIRAL-WOUND LIQUID MEMBRANE MODULE FOR SEPARATION OF FLUIDS AND GASES

BACKGROUND OF THE INVENTION

1. Field of the Invention

The present invention relates to filtering devices, membranes, and technology for use in separating fluids and gases.

2. Description of the Art

Separation of miscible compounds has traditionally relied on methods such as distillation, liquid-liquid extraction, crystallization/precipitation, gas stripping, adsorption, and membrane permeation. Each method has its range of applications and certain advantages over other methods. Differences depend on such factors as the nature of the mixture to be separated, the concentration of the components, the end uses of the components, the degree of separation/purification desired, economic factors, and so on.

Common applications of membrane technology intended for the separation of miscible liquid compounds are solvent dehydration and VOC removal from wastewaters, i.e. removal of the minor component of a mixture via selective permeation. Pervaporation is commonly used to remove water from the ethanol-water azeotropic mixture to yield fuel-grade ethanol.

Ethanol recovery and purification from a fermentation broth is a common operation, and increasingly so with the growth of fuel ethanol derived from grain or biomass saccharification and fermentation. Fermentation is typically run in batch-mode, and the resulting fermentation broth is fed gradually into a distillation column, or a series of columns. Ethanol is removed from this broth, but to do so a large portion of the balance (mainly water) must also be vaporized. As the overhead product approaches the ethanol-water azeotrope of about 96 wt % ethanol, the reflux ratio requirement rises dramatically, requiring larger and larger amounts of liquid to be vaporized and condensed. Fuel ethanol plants are typically operated such that distillation yields a stream that is somewhat below the azeotropic ethanol concentration; dehydration is accomplished by pervaporation or adsorption. Thus there is an optimum distillation operating concentration that balances the costs of distillation with the costs of dehydration. This is a very energy-intensive process, which is an undesirable quality when the goal is fuel production. Distillation, therefore, is not the ideal separation method for fuel ethanol.

Liquid-liquid extraction and membrane permeation are the two most commonly considered alternatives to distillation. Both are best utilized in removal of a minor component from a mixture. These methods are both less energy-intensive than distillation, and they also lend themselves to continuous or semi-continuous operation of the fermenter, with demonstrated increases in productivity and yield. They are not without their shortcomings, however.

Liquid-liquid extraction, for example, is generally a complicated and inefficient multi-step process: the feed is contacted with the solvent (usually with vigorous agitation to promote increased mass transfer via high surface area due to small droplet sizes, and convective as well as diffusive mass transfer), the solvent and feed phases are disengaged (usually by settling), and the product is removed from the solvent phase by distillation, gas stripping, flashing, a temperature shift to promote a phase separation, or other means. In addition, liquid-liquid solvent extraction is often further complicated by the formation of emulsions, which make phase-separation difficult and also lead to enhanced solvent losses to the feed mixture.

Membrane permeation methods, such as pervaporation, are alternatives which have been studied for ethanol recovery from dilute aqueous solutions. Pervaporation involves contacting the feed with a large amount of membrane surface area, permeating the product through the membrane into a vacuum or sweep gas, condensing the permeate vapor, and supplying vacuum for initial startup and removal of noncondensibles during operation. The process is appealing due to its simplicity, but the membranes themselves are expensive to manufacture and suffer from a short lifetime, often requiring replacement every 2-4 years.

A basic technical problem that neither liquid-liquid extraction nor conventional pervaporation has been able to overcome is producing ethanol above 95 wt % purity from a typical fermentation feed of 5-12% ethanol in one step. Of course, it is possible to add additional steps in order to achieve the desired purity level, but to do so requires additional equipment and therefore additional cost.

For membrane permeation, membrane modules have generally been manufactured using one of the following basic configurations: plate-and-frame, tubular, capillary, hollow fiber, and spiral wound. See R. Baker, Membrane Technology and Applications, $2^{nd}$ ed, 2004. Each configuration has its own advantages and disadvantages.

Plate-and-frame and tubular modules tend to be the most expensive, with spiral-wound, capillary and hollow fiber modules being less expensive. For liquid separations, hollow fiber systems are relatively more prone to fouling and concentration polarization compared to all other designs. When the permeate is carried in the fiber lumen, the permeate-side pressure drop in hollow fiber systems is much higher than in spiral-wound modules; this reduces the driving force for separation, and thus negatively affects flux. Hollow fiber and capillary systems are limited to certain specific types of membrane materials (due to the manufacturing method, which requires high-speed automated spinning and fiber handling equipment), whereas spiral-wound, tubular and plate-and-frame designs are more versatile.

Spiral-wound configurations are notable because they provide a higher ratio of membrane surface area to volume of the module, compared to flat-plate and tubular modules. Hollow fiber modules provide even higher ratios, but this is often offset by the lower fluxes achieved in them, which then require additional surface area, negating the advantage over spiral-wound systems.

Various membrane designs have been attempted, but for each there appear to be shortcomings.

For example, U.S. Pat. Nos. 4,750,918, 4,789,468, and 5,637,224, all to Sirkar et. al., relate to the use of hollow fiber/liquid membrane pervaporation for the removal of volatile organic compounds from aqueous solutions. They describe a combination process of solvent extraction to extract volatile organic compounds (VOCs) from wastewater coupled with pervaporation to remove the VOCs from the extracting solvent. The module is the hollow-fiber type. The '224 patent in particular discloses a device whereby the feed (wastewater solution containing VOCs) flows through the center of a porous hollow fiber. Surrounding the hollow fiber is the extraction solvent. Either the feed, or the solvent, preferentially wets the pores of the hollow fiber. VOCs are extracted through the pores and into the solvent, and the resulting retentate (purer water) exits the hollow fiber at the other end of the module. A second hollow fiber, whose wall is a nonporous pervaporation membrane, runs through the module parallel to the first hollow fiber. The inside of this second hollow fiber is connected to a vacuum source. The VOCs in the extraction solvent external to this second hollow fiber permeate through its walls and into its center, and exit as vapor to the vacuum source. This device has several shortcomings, however. For example, it has limited versatility since it appears to be limited for use in wastewater remediation, not recovery of bio-based chemicals. Moreover, the device would not be suitable for use with fermentation broths, as it would be susceptible to fouling and clogging, as the feed mixture must flow through hollow fibers of extremely small diameter (100-300 microns in the example). Finally, the device is prone to destabilization of the interface (i.e., flow of one phase into the other through the pores), and requires operation such that a pressure difference across the porous membrane must be maintained at a sufficiently low value to prevent destabilization.

U.S. Pat. No. 5,580,452 to Lin (1996), "Moving Liquid Membrane Modules" describes an extraction system wherein a component of a feed solution is extracted through a porous membrane into a solvent, then removed from the solvent by back-extraction through a second porous membrane into a second fluid. Additionally, the solvent contained between the two membranes is flowing in order to increase mass transfer. A spiral-wound module is described, as is a tubular module form where the membranes are concentric tubes. The feed flows through the center of the inner tube, the solvent flows between the two tubes, and the strip fluid is outside the second tube. A hollow-fiber module is also detailed. This configuration results in the extracted components being removed by back-extraction into another fluid, via a porous membrane, which in turns leads to a further separation step in order to isolate the permeated components from the strip solution.

The device described by P. Christen, M. Minier et. al. in "Ethanol Extraction by Supported Liquid Membrane During Fermentation", Biotechnol. Bioeng., 36, pp 116-123 (1990), is a supported liquid membrane in a flat-plate configuration, which is used to remove ethanol from a fermentation broth. Two modes of operation are described. The first method is perstraction whereby water is circulated on the permeate side of the membrane, thus back-extracting the ethanol from the supported liquid membrane. In this mode, however, the supported liquid membrane has proven to be unstable, with gradual loss of solvent from the pores of the supporting membrane. The second mode employs pervaporation, whereby air is circulated on the permeate side of the membrane, thus evaporating the ethanol from the supported liquid membrane. The supported pervaporation liquid membrane is stable, but fine control of the pressure difference across the membrane is necessary in order to prevent ejection of the solvent from the pores, and such control is quite difficult to achieve. Moreover, there is no method to replenish extraction solvent lost from the pores of the supported liquid membrane, and in perstraction mode the ethanol must still be separated from the water used in order to strip it from the extraction solvent. The permeated components thus are not obtained directly. Additionally, in pervaporation mode, recovery of the ethanol is difficult because the ethanol vapor is in a relatively low concentration in the sweep gas. Finally, the condenser used must have a relatively large surface area and operate colder, compared to the present invention which operates under vacuum.

The device described by T. Itoh et. al. in "Permselectivity of Liquid-Polymer Hybrid Membrane Composed of Carbon Tetrachloride and 2-Hydroxyethyl Acrylate-Acrylonitrile Graft Copolymer for Ethanol-Water Mixture", Polym. J., 15, pp 827-834 (1983) details the extraction of ethanol from an ethanol-water mixture into a layer of solvent (carbon tetrachloride), and the further permeation of the ethanol from the solvent through a nonporous membrane by pervaporation. The solvent in this device is not contained in the pores of a supporting membrane and the measured flux was extremely low. Hence, this type of configuration is not suitable for commercial applications.

Given the shortcomings of each of the preceding devices, what is needed is a simple, efficient, and economical system with low energy requirements for separating miscible compounds.

SUMMARY OF THE INVENTION

The present invention is a device that performs the operations of solvent extraction and pervaporation in a single piece of equipment, configured as a spiral-wound membrane module, and provides for the replenishment of the solvent in the supported liquid membrane while the module continues in operation. It provides a solution to the problem of separating miscible compounds efficiently and with low energy requirements.

This device has several advantages.

By combining the two processes into a single module, solvent extraction can be achieved with reduced complexity and lower capital costs due to the elimination of one or more major pieces of downstream processing equipment for removal of the product from the solvent.

Another advantage realized through use of the module is the enhancement of the purity of the resulting product over what either solvent extraction or pervaporation can do alone.

A further advantage of the device is lower energy cost, particularly compared to conventional distillation.

Yet another advantage is the elimination of the need in liquid-liquid solvent extraction for vigorous feed-solvent contacting and the resulting phase-separation step, and elimination of the potential for emulsion formation through use of the contained liquid membrane.

A further advantage is the stabilization of the supported liquid membrane, which is achieved through both the physical containment by a hydrophilic skin layer over the pores of the support membrane, as well as the ability to continuously replenish solvent lost through permeation.

Finally, the module is versatile, suitable for a wide range of applications, and is therefore cost-effective.

Other objectives and advantages will become apparent in the specification and drawings below.

IDENTIFICATION OF PARTS AND ELEMENTS OF THE INVENTION

Antitelescoping device (5)
Feed (6)
Feed inlet (20)
Feed spacer (4)
Feed spacer edge wrap (10)
Gasket ring (8)
Housing (30)
Membrane sandwich (2)
Membrane sandwich edge wrap (9)
Membrane module (28)
Microporous hydrophobic membrane (18), which contains the supported liquid membrane
Permeate (6a)
Permeate collection tube (1)
Permeate collection tube perforations (1a)
Permeate outlet (22)
Permeate spacer (12)
Pervaporation membrane (14)
Retentate (6b)
Retentate outlet (26)
Retention bands (3)
Solvent (7)
Solvent inlet (24)
Solvent spacer (16)

DEFINITIONS

"Facilitated transport" is the enhancement of mass transfer through a medium by addition of a material which can bind reversibly to the desired product, forming a complex. This increases the carrying capacity of the medium for the product, and creates a complex which will diffuse through the medium in addition to the normal diffusion of the uncomplexed product, thus increasing flux.

"Feed" is the parent liquid mixture, from which a product is to be separated.

"Flux" is the amount of permeate obtained per unit area of membrane, per unit time (usually in kg/(m² hr)).

A "membrane" is a thin barrier that permits selective mass transport

A "composite membrane" is a membrane made up of two or more structural elements made from different materials. For example, a porous support layer provides mechanical strength, and a very thin top-layer performs the separation.

"Permeate" is the portion of the feed mixture which penetrates the membrane sandwich.

"Permselective" describes the quality of a membrane to carry out the selective separation of components of a mixture by the difference in their permeation rates through the membrane. "Permselective skin layer" refers to the very thin top layer of a composite membrane that controls the separation of components in a mixture by differential permeation, the other layers of the composite membrane having little or no permselectivity.

"Pervaporation" refers to a separation process whereby a liquid feed solution contacts a nonporous membrane, a portion of the feed permeates through the membrane, and the permeate exits the membrane as a vapor. The term "pervaporation" is a contraction of the words "permeation" and "evaporation."

"Pervaporation membrane" or "composite pervaporation membrane" is a homogeneous, asymmetric, or composite membrane, with a nonporous component which is permselective.

"Retentate" refers to that portion of the feed mixture which remains after contact with the membrane; i.e. the portion that has not permeated into the membrane.

"Solvent" refers to the liquid used to selectively extract components of the feed mixture. Examples of such solvents are alcohols, esters, carboxylic acids, aldehydes, ketones, alkanes, alkenes, aromatics and non-aromatic ring compounds, mixtures of solvents, and solvents containing agents which can complex with one or more of the components of the feed mixture, thus facilitating mass transfer and selectivity.

"Spacer" is a mesh which serves to form a channel of defined thickness between two membrane sheets, through which a liquid or gas can travel, and which, in the case of liquid feed spacers, promotes turbulence in liquids flowing through it with the object of enhancing mass transfer.

"Membrane module" is a configuration of one or more membranes, configured in such a way as to direct the feed solution to one side of the membrane or membrane sandwich, remove retentate from that side of the membrane or membrane sandwich, and remove permeate from the other side of the membrane or membrane sandwich. Examples of types of modules are the spiral-wound, the plate-and-frame, the tubular, and the hollow fiber designs.

"Microporous hydrophobic membrane" refers to the membrane used here to support the liquid solvent in its pores, creating a supported liquid membrane. The solvent which forms the liquid membrane is hydrophobic, and wets the pores of the microporous hydrophobic membrane.

"Spiral-wound membrane module" refers to a module wherein the membrane is wrapped in spiral-fashion around a central tube, the membrane module being contained in a cylindrical housing.

"Supported liquid membrane" refers to a thin layer of solvent, immiscible with the feed solution, which is contained in the pores of a microporous membrane. The membrane material is such that the pores are wetted by the solvent, and not by the feed solution.

"Distribution coefficient" refers to the partition of a component between two immiscible phases in a liquid-liquid solvent extraction, and is the ratio of the concentration of a component in one phase divided by the concentration of the same component in a second phase.

"Separation factor" is defined as the concentration of component A in the product stream divided by its concentration in the feed stream, this ratio further divided by the ratio of the concentration of component B in the product divided by its concentration in the feed.

DETAILED DESCRIPTION OF THE INVENTION

The device disclosed herein combines a supported liquid membrane with a pervaporation membrane in a spiral wound module configuration or membrane winding assembly for use in separating liquid mixtures and gas mixtures. It exploits two phenomena: liquid extraction, whereby one or more components of a feed mixture are taken up into the solvent, and pervaporation, whereby one or more of the components extracted by the solvent are selectively removed by permeation through a nonporous membrane, exiting the membrane as a vapor.

The extraction solvent is contained in the pores of a microporous, hydrophobic membrane; this forms the supported liquid membrane.

Since small amounts of solvent will be lost due to solubility in the feed, there is a provision to replenish the solvent while the module is in operation. Also, to eliminate instability and solvent loss due to physical removal of solvent droplets from the supported liquid membrane, the pores facing the feed are covered with a thin, hydrophilic skin layer that has a very low permeability to the solvent, but a high permeability to the feed components to be removed from the feed.

The pervaporation membrane is in close proximity to the supported liquid membrane, being separated from it only by the width of the solvent spacer, thus minimizing the mass transfer distance that components removed from the feed must traverse before contacting the pervaporation membrane.

The aforementioned membranes and spacers are formed into a sandwich, which is spiral-wound around the permeate collection tube. The permeate collection tube can be a hollow cylinder with at least one row of perforations oriented along the longitudinal axis of the cylinder. The sandwich is interleaved with additional spacers which supply feed and remove retentate. This module configuration leads to a high density of membrane area per unit volume. The module so formed is itself contained inside a cylindrical housing, which includes various inlet and outlet ports, effectively channeling gas or liquid mixtures into the module and then removing the separated gases/fluids after they have been processed, and supplying solvent to the supported liquid membrane.

The feed/retentate streams, the permeate stream, and the solvent must be kept physically separated from each other.

To isolate the permeate, a permeate spacer, which is formed by a sheet of mesh, is contained between two sheets of pervaporation membrane, and is closed off on three sides by gluing the pervaporation membrane support layer faces together. At the fourth side, the permeate spacer is in contact with the permeate collection tube perforations, and the support layer side of the pervaporation membranes are glued to the permeate collection tube. This prevents any direct contact of the solvent or feed/retentate with the permeate.

To isolate the feed/retentate from the solvent, the feed spacer is wrapped with an impermeable film on its outer edge, where it protrudes from between the membrane sandwiches that are on either side of it and faces the solvent inlet. The edges facing the feed inlet and retentate outlet are left open. Similarly, the membrane sandwich is wrapped with an impermeable film on the edges facing the feed and retentate openings, and left open on the edge facing the solvent inlet. Lastly, a sealing ring or gasket is placed at each end of the module, sealing the module envelopes and feed spacers with the module housing, thus preventing feed/retentate at the ends of the housing from mixing with solvent in the middle part of the housing's shell. This sealing ring or gasket will be glued or caulked to the module so that a good seal is made with the stepped surface formed from the membrane envelope sheets and the feed spacer sheets.

There are several deficiencies with either solvent extraction or pervaporation as stand-alone processes.

Most commonly, solvent extraction requires three separate steps: (1) contacting the feed with the solvent and thereby transferring one or more components from the feed to the solvent, (2) physically separating the resulting solvent mixture from the depleted feed material, and (3) recovering the extracted components from the solvent and recycling the solvent for use in step (1). Each of these steps generally requires a separate piece of equipment to accomplish. A typical method to recover the extracted material from the solvent is distillation.

Pervaporation of, for instance, ethanol from dilute aqueous solutions has the problem that the current pervaporation membranes are unable to concentrate the ethanol permeate sufficiently, and further processing is required. This would take the form of either distillation, or additional membrane separations, or adsorption, for example. Again, additional separate pieces of equipment must be added to the initial pervaporation system.

By combining solvent extraction with pervaporation in a single piece of equipment, this invention can in many cases remove the need for further downstream processing equipment. In addition, problems with conventional solvent extraction such as emulsion formation and large solvent losses to the feed due to phase separation difficulties are removed: the hydrophilic layer overlaying the pores holding the liquid membrane prevents physical mixing of the feed and solvent, and thereby prevents emulsion formation and also eliminates the need for phase separation. In addition, the choice of potential solvents is larger since a density difference between the feed and solvent is no longer required for operation.

Physical Structure and Assembly

In the disclosed device, membrane sandwiches (2) are spirally-wound around a permeate collection tube (1), interleaved with feed spacers (4), and sealed at the periphery to prevent mixing of the feed/retentate, the permeate, and the solvent. See FIG. 1. There are five separate layers involved in the device. See FIGS. 2, 4-5.

The first layer is comprised of a feed spacer (4), a mesh, through which the feed (6) flows in the axial direction. See FIG. 4. The retentate (6b) (feed solution depleted in the permeating components) exits axially at the opposite end of the module from the feed.

Figure 4:
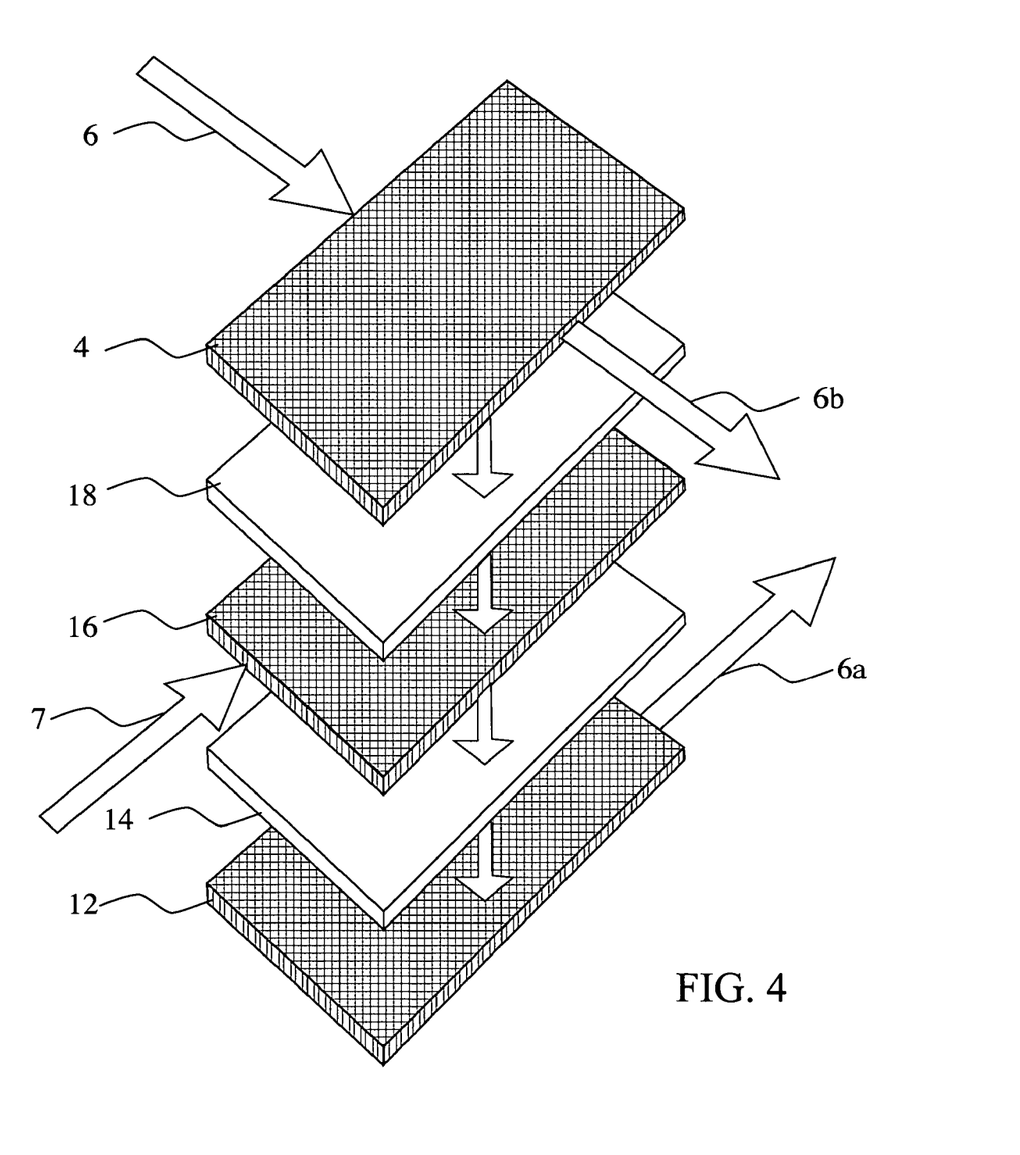
FIG. 4 is a schematic of the membrane and spacer layers, showing the different elements and flows. Feed (6) enters, and retentate (6b) exits, the feed spacer (4). Components are extracted from the feed and enter the microporous membrane (18) which contains the supported liquid membrane (SLM) in its pores. Extraction solvent (7) enters the solvent spacer (16), and replenishes solvent lost from the supported liquid membrane. The components extracted from the feed into the SLM diffuse into the solvent in the solvent spacer, and then are selectively permeated through the composite pervaporation membrane (14). The permeate (6a) from the membrane is collected in the permeate spacer (12), which transports it as a vapor to the permeate collection tube (1).

A second layer contains the supported liquid membrane (SLM). The SLM is composed of the extraction solvent held in the pores of a microporous hydrophobic membrane (18); there is a nonporous hydrophilic "skin" layer that closes the pores and is in contact with the feed solution in the feed spacer.

The third layer is the solvent spacer (16), a mesh. Makeup solvent (7) enters this spacer at the outer circumference of the module and delivers it to the SLM contained in the microporous hydrophobic membrane (18) to replenish any solvent lost by permeation to the feed retentate or permeate.

The fourth layer is a composite pervaporation membrane (14) composed of a porous or microporous support layer which supports a nonporous permselective skin layer which faces the third layer.

Figure 1:
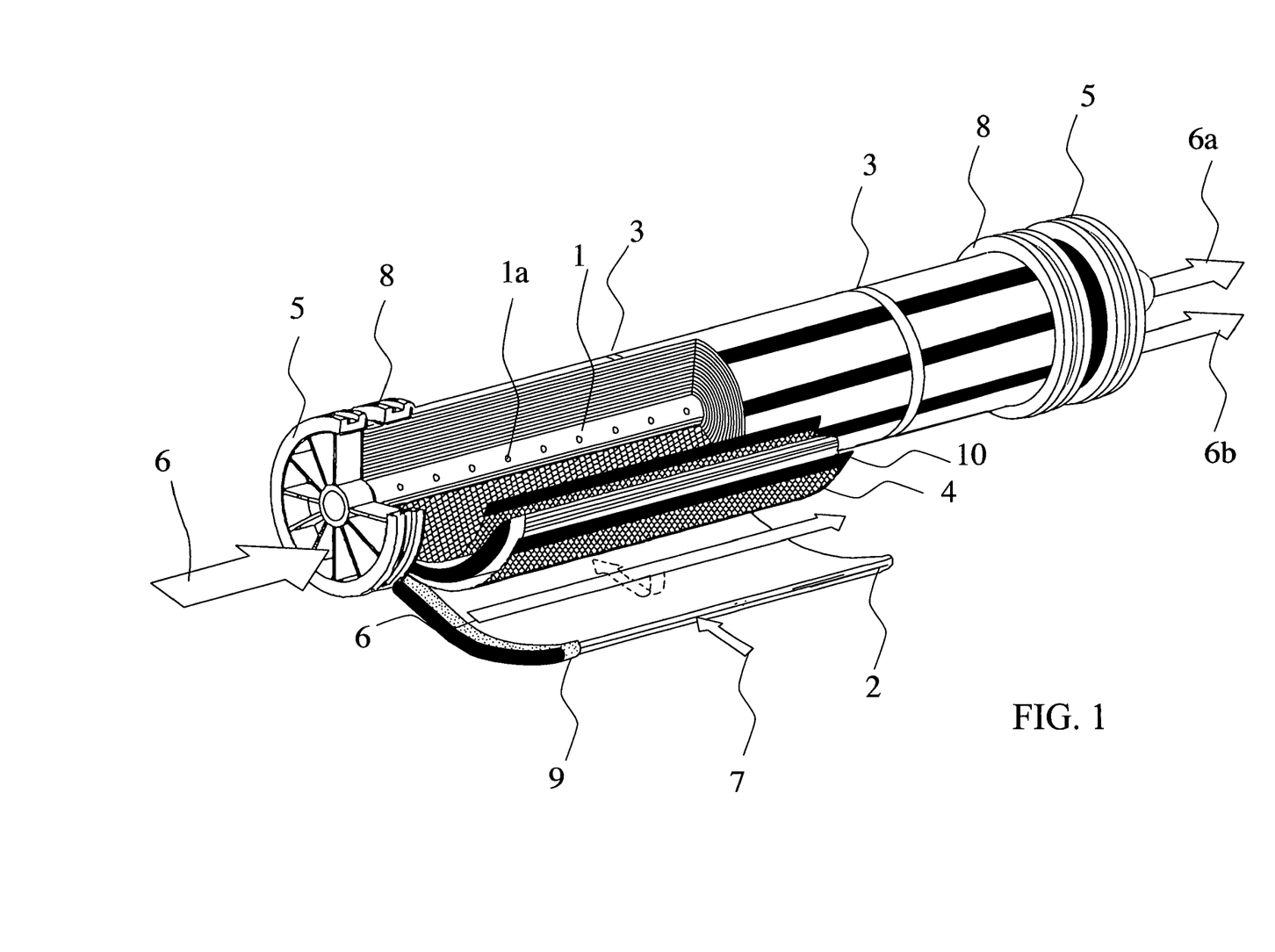
FIG. 1 shows a schematic perspective cutaway view of the membrane module (28).
Figure 2:
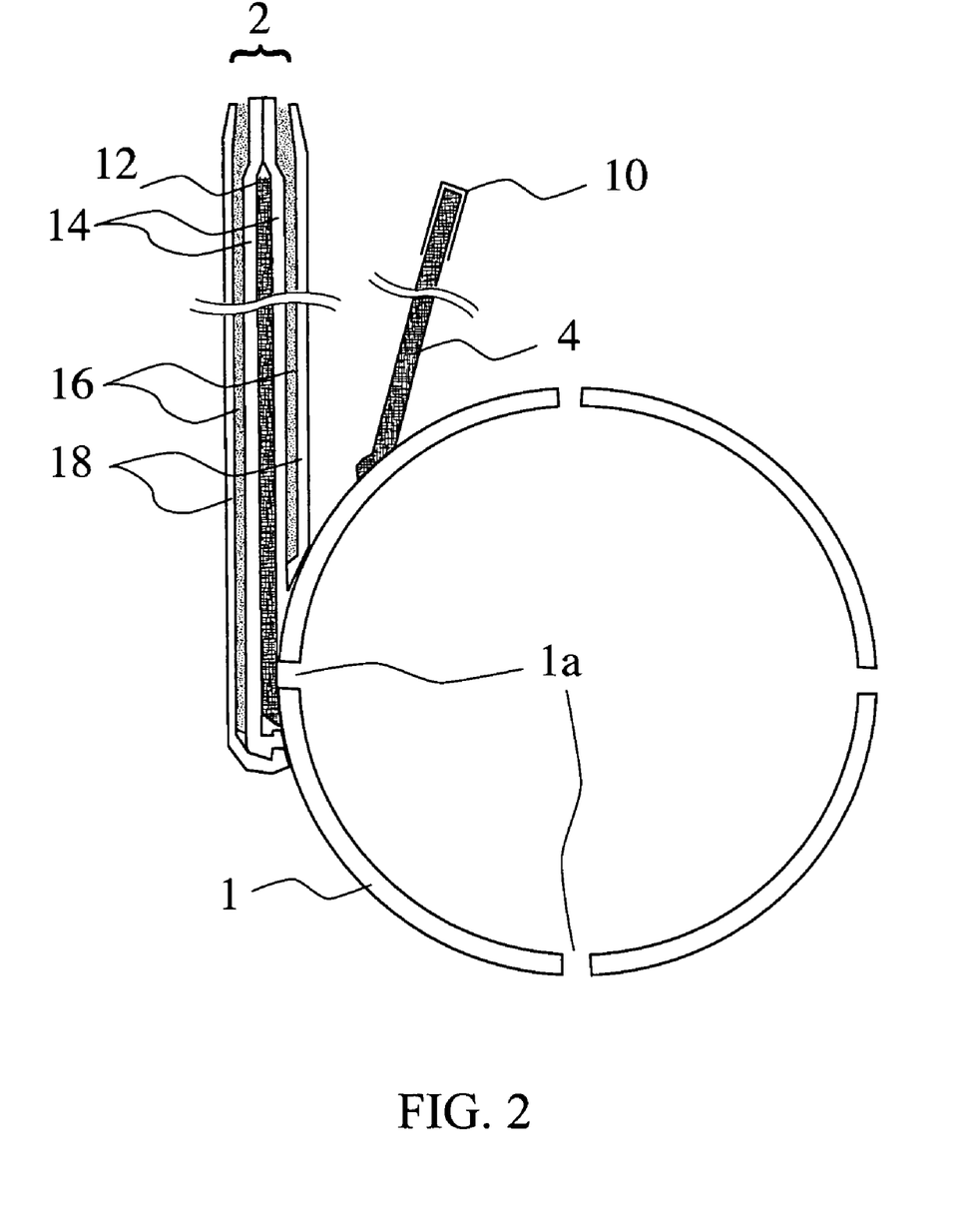
FIG. 2 shows a cross-sectional view of the permeate collection tube (1) being wrapped with a single feed spacer (4) and membrane sandwich (2).
Figure 5A:
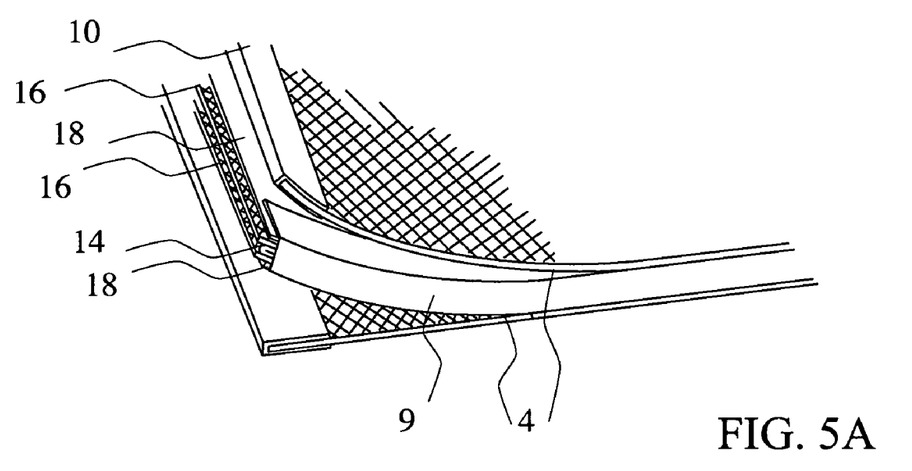
FIG. 5A shows a schematic of the membrane sandwich (2), two feed spacers (4), and their impermeable edge wraps (9, 10)
Figure 5B:
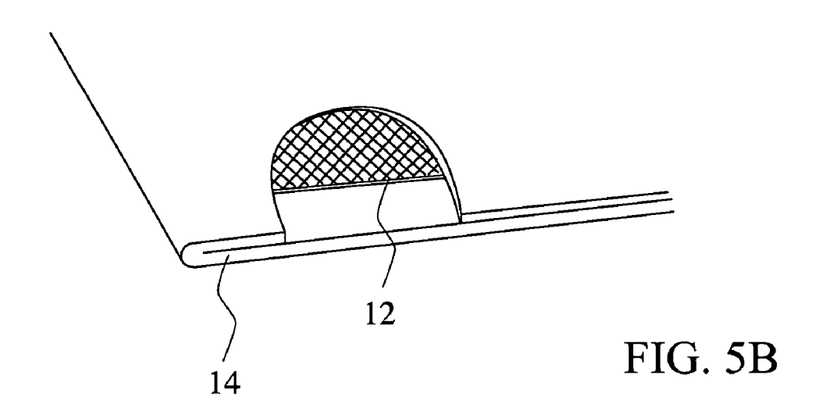
FIG. 5B shows a cut-away view of the pervaporation membrane envelope showing the two pervaporation membrane sheets (14) and the enclosed permeate spacer (12).

The fifth layer is the permeate spacer (12), a mesh, which delivers the permeate vapor inwards to the perforated permeate collector tube (1). See FIG. 2. As shown in FIGS. 1, 2, and 5, the membrane module is assembled in layers such that the permeate spacer (12) is contained between two pervaporation membranes (14), which overlap and are glued together, using an adhesive which is compatible with the fluids handled, at three edges to make a membrane envelope (see FIG. 5B), with the permselective layer of each pervaporation membrane facing away from the permeate spacer. The envelope described above is contained between the two mesh solvent spacers (16), forming an intermediate sandwich open on all sides. The intermediate sandwich described above is contained between the two microporous hydrophobic membranes (18) containing the supported liquid membranes, with the nonporous hydrophilic skin facing away from the solvent spacer, forming the final sandwich (2).

An impermeable edge wrap is glued or otherwise attached to two opposite edges of the final sandwich to prevent feed from mixing with the solvent or bypassing the supported liquid membrane layers. See FIGS. 5A and 1.

Referring to FIGS. 1 and 2, a permeate collection tube (1), which consists of a hollow cylinder provided with two or more rows of small perforations (1a) running longitudinally down the cylinder, with the rows evenly spaced apart on the circumference, is disposed such that a membrane sandwich covers each row perforations, with the open edge of the permeate spacer (12) covering the row of perforations and the pervaporation membranes (14) and microporous hydrophobic membranes (18) containing the supported liquid membrane being glued to the permeate collection tube adjacent to the row of perforations.

Referring to FIGS. 1, 2, and 5A, feed spacers (4), consisting of rectangular sheets of mesh, are glued at one edge to the permeate collection tube (1), the glued edge running longitudinally along the tube, with each feed spacer sheet situated between two rows of perforations. The feed spacer edge farthest away from the permeate collection tube is wrapped with an impermeable film to prevent solvent and feed/retentate from mixing.

After gluing, the membrane sandwiches (2) and the feed spacers (4) are wound circumferentially around the permeate collection tube (1), alternating a feed spacer (4) and a membrane sandwich (2). See FIGS. 1 and 2. Upon completion of the wrapping, retention bands (3) are wrapped around the cylindrical assembly to keep the individual leaves from unwinding. Circular sealing devices (8) are slipped over each end of the outer winding and glued, such that they are in contact with the end wrap, and form a seal with the sandwich and feed spacer layers and the module housing. An anti-telescoping device (5) is added at each end to prevent telescoping of the layers under differential pressure.

Figure 3:
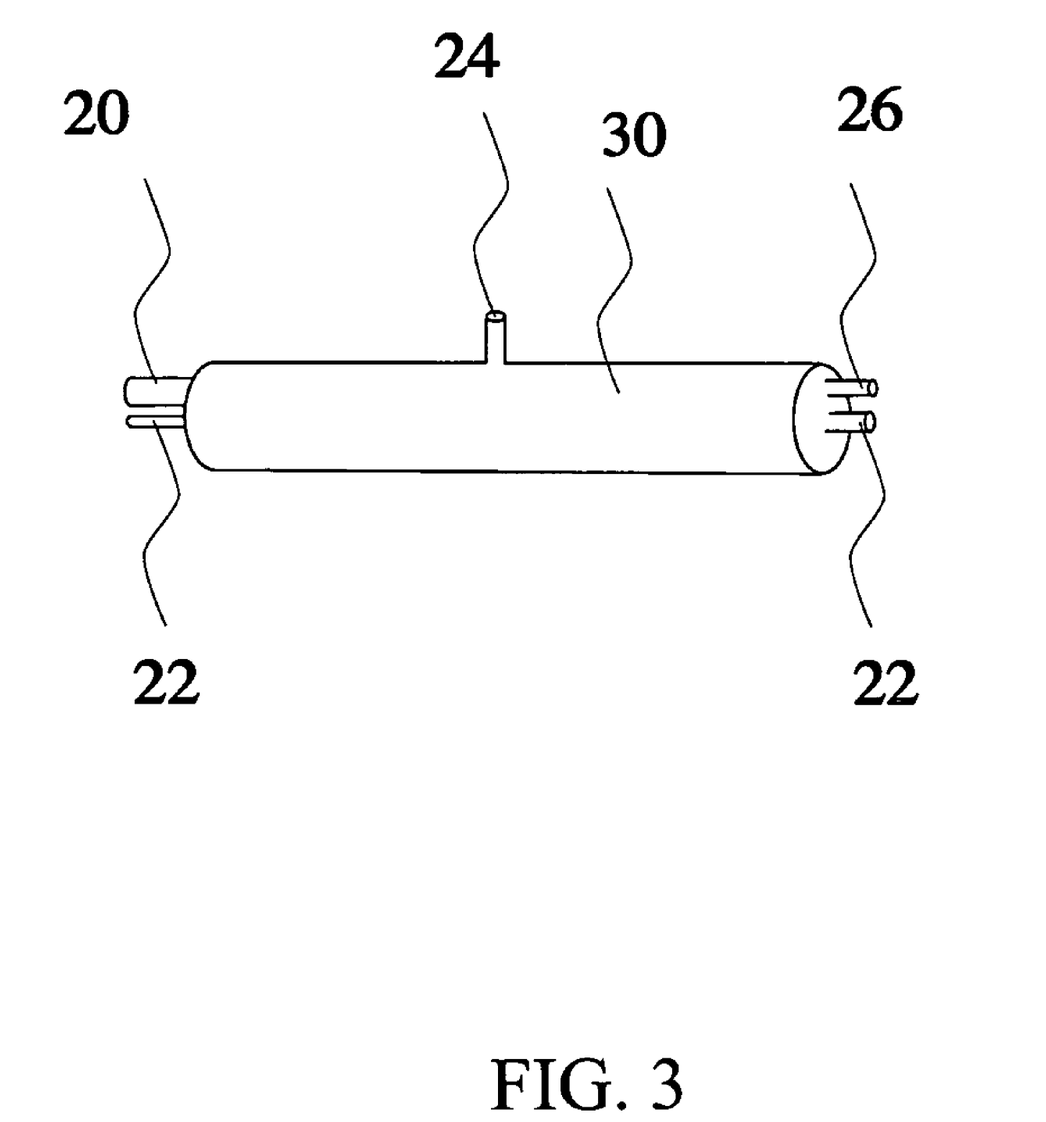
FIG. 3 shows a perspective view of the housing (30) which contains one or more modules (28), emphasizing the inlet and outlet ports. The housing has both inner and outer walls.

The module is inserted into a cylindrical outer housing (30), such that the gaskets form a seal at each end, preventing intermingling of the feed with the solvent makeup. More than one module may be inserted into a housing; in this situation the retentate from the first module becomes the feed for the second, and so on. A separate solvent inlet (24) on the housing is required for each module. FIG. 3 shows the housing for a single module (30), which has one solvent makeup inlet (24) on its circumference, permeate outlets (22) central to each end, a feed inlet (20) offset from center at one end, and a retentate outlet (26) offset from center at the other end.

Operation

Vacuum is applied to the permeate collection tube (1) and solvent is introduced through the solvent inlets (24) on the housing (30). Capillary action and the influence of the vacuum draw the solvent into the solvent spacers (12) and then into the pores of the microporous hydrophobic membranes (18), thus forming the supported liquid membranes. The vacuum on the permeate-side draws air out of the microporous membrane, solvent spacer, and solvent reservoir in the shell of the housing, and aids in uniform distribution of solvent throughout the solvent spacer and microporous membrane.

Once the supported liquid membrane is formed, the feed (6) enters the housing (30) through the feed inlet (20). Within the housing, the feed enters the edges of the feed spacers (4). It travels longitudinally through the feed spacers, gradually becoming depleted in the permeated components, and exits the feed spacers through the opposite edge, leaving the housing through the retentate outlet (26). If multiple modules are contained in one housing, the retentate from the first becomes feed for the second, and so on.

The permeated components (6a) permeate from the feed spacer (4) into the hydrophilic skin of the microporous hydrophobic membrane (18), then into the solvent (7) contained in the pores of the microporous support membrane. A selective separation occurs, which is based on the extractive characteristics of the solvent for the feed components. From there, the permeated components diffuse into the solvent in the solvent spacer (16), and then permeate through the pervaporation membrane (14). A second selective separation occurs in the pervaporation membrane, based on its permselectivity for the components in the solvent. The permeate spacer is under vacuum conditions. The permeate exits the pervaporation membrane as a vapor, which travels through the permeate spacer (12) and into the permeate collection tube (1). The permeate vapor exits the module through either permeate outlet (22).

External to the module housing are one or more condensers (not shown) for condensing the permeate vapor, followed by a vacuum pump. The feed (if a liquid) is supplied to the module via a pump, at relatively low pressures. Since small amounts of solvent will be lost via permeation either into the retentate or the permeate streams, makeup solvent is supplied via the makeup solvent inlet (24) on the module. The makeup solvent flows into the exposed edges of the solvent spacers (16) in the outer circumference of the module, and spirals inwards within the spacers to replenish lost solvent in the supported liquid membrane.

EXAMPLES

Generally, this device can be used with any chemical or mixture of chemicals that can be separated from a parent mixture by solvent extraction, and which are volatile enough to be removed by pervaporation from the extracting solvent. Below are several examples of how the device can be employed.

Example 1

Biofuels

In the biofuels industry, the disclosed device can be used for removing and purifying ethanol from dilute aqueous fermentation broth. The membrane module is constructed using composite pervaporation membranes suitable for permeating ethanol selectively over water or the extraction solvent, such as those based on a permselective layer of polydimethyl siloxane (PDMS, silicone rubber), or mixtures of PDMS and inorganic ethanol permeation-enhancing materials such as silicalite-1, a hydrophobic zeolite. Examples of such pervaporation membranes are those produced by GFT and MTR. The feed, solvent and permeate spacers are made of polypropylene mesh, or other materials that are compatible with the fluids being contacted. Examples of materials that can be used for the hydrophobic microporous membrane are polypropylene (e.g Celgard) or polytetrafluoroethylene (e.g. GoreTex). The hydrophilic skin layer is composed of a material compatible with both the feed/retentate and the solvent. It is applied to the porous hydrophobic membrane via any of several techniques, such as interfacial polymerization or plasma polymerization.

The solvent is chosen to have a high affinity for ethanol and a low affinity for water, and to have a low permeability through both the hydrophilic skin layer and the pervaporation membrane. In addition, because of the potential for some permeation of the solvent into the retentate, the solvent must have a low level, or zero level, of inhibition to the fermentation microorganisms. If the byproducts of fermentation are used as animal feed, however, the extraction solvent must also have a low level of toxicity and not effect palatability of the feed to the animals. Because of the potential for some solvent permeation into the permeate, the solvent must be compatible with the end-use of the permeate, i.e. in fuel systems in this application. Oleyl alcohol is an example of such a solvent.

In preparation for operation, a vacuum is established at the permeate outlet(s), solvent is charged to the module, air is removed from the module, the SLM is established, and fermentation broth is then introduced at the feed inlet. To minimize fouling and enhance operational longevity, a microfiltration pretreatment of the feed is desirable.

In operation, ethanol and water in the feed easily permeate the thin, hydrophilic skin layer and are selectively partitioned into the solvent in the supported liquid membrane. Oleyl alcohol, for instance, will at 33° C. have an equilibrium separation factor of about 15, and an ethanol distribution coefficient of about 0.29. Hence, if the ethanol concentration in the fermentation broth is 5 wt %, the equilibrium ethanol concentration in the solvent will be about 1.45 wt %, and the water concentration will be 1.8 wt %, which is a significant enrichment of the ethanol concentration from 5 wt % in the feed to about 44 wt % in the solvent, on a solvent-free basis. Ethanol and water diffuse through the solvent to the permselective skin layer of the pervaporation membrane. A second enrichment of the ethanol-to-water ratio occurs in permeation through this selective layer. PDMS-based membranes will typically display an ethanol/water separation factor of about 10, resulting in an ethanol-to-water ratio in the permeate of about 8.1, or a permeate composed of about 89 wt % ethanol and 9 wt % water.

As there is potential for some solvent permeation into the retentate and permeate streams, makeup solvent is continuously available during operation via transfer from the solvent inlet to the solvent spacers, to the supported liquid membrane.

Thus, the device can achieve ethanol product concentrations similar to those obtained by distillation utilizing a beer column followed by a rectification column, but at significantly lower energy utilization. In both cases, a further dehydration step is required to achieve the low water levels of fuel-grade ethanol.

Example 2

Bio-Based Chemicals

In the bio-based materials industry, the device can be used for removing chemicals formed by fermentation means from dilute aqueous fermentation broth. Such chemicals, for example, are alcohols such as methanol, ethanol, propanols, butanols, diols; acetone; and carboxylic acids such as lactic, acetic or propionic acid. Often, such products are inhibitory to the microorganisms producing them. Butanol is a good example, wherein butanol production decreases to near zero at broth concentrations around 1% butanol. Continuous removal of the inhibitory fermentation products has been shown to confer significant improvements in fermenter productivity and substrate utilization.

The module is suitable for recovery and purification of the lower alcohols. For carboxylic acid products, solvents or mixtures of solvents with some basicity, such as amines, are good choices due to their ability to complex with the acidic product, thus enhancing capacity, separation factor and mass transfer via facilitated transport in the solvent.

Example 3

Wastewater Treatment

The device can be used for removal of VOCs (volatile organic compounds) from wastewaters. In this example, viable candidates for removal/recovery must be able to permeate the hydrophilic skin layer (i.e. be at least moderately hydrophilic), and be compatible with the materials of construction of the module and its housing. Also, they must be sufficiently volatile to permit efficient removal from the solvent by the pervaporation membrane.

In the case where the object is to reduce or eliminate the hazardous character of the wastewater to be treated, the extraction solvent must have an extremely low solubility in water, and/or be of sufficiently low toxicity and environmental impact as to significantly reduce the hazardous nature of the wastewater to make the operation worthwhile.

In the case where the wastewater contaminants have a high enough intrinsic value to make their recovery worthwhile, the extraction solvent must be economic to use (i.e. loss of solvent to the retentate is not an important economic factor) and must either be compatible with the permeate's end use, or permeate through the pervaporation membrane at such a low rate that the solvent's concentration in the permeate is below the maximum allowable concentration.

VOCs common in wastewaters generated by the chemical and semiconductor industries and amenable to removal and purification by this device include methanol, butanol, ethylene glycol, acetone, methyl ethyl ketone, ethyl acetate. These VOCs are difficult to recover by pervaporation alone, where separation factors of 5 are typical.

Example 4

Petrochemical Industries

The device can be used for separation of saturated/unsaturated hydrocarbons and aromatic/nonaromatic ring compounds such as benzene/cyclohexane through use of a selective solvent or solvent mixture, and pervaporation membrane which is permselective to the desired separation.

The device can also be used for separating such gas mixtures as methane/carbon dioxide, ethane/ethylene, propane/propylene, nitrogen/light organics, and acid gas removal from gas streams. In many gas separations, operations are conducted at elevated feed pressures. In this situation, the solvent, and more particularly the supported liquid membrane, must be pressure-balanced with the feed in order to avoid a pressure differential across the liquid membrane that would express it from the pores. The hydrophilic skin layer will be insufficient as a barrier due to its high gas permeability.

In all these applications the extraction solvent, or solvent mixture, must be selective towards one or more desired components in the feed mixture, and the pervaporation membrane must also be selective to the desired component (s). For example, to separate unsaturated compounds from alkanes, a complexing agent such as a silver or copper ion is combined with a carrier fluid to form the extraction medium. This type of complexing agent will selectively remove unsaturated compounds. Since the solvent mixture must be hydrophobic, crown ethers or organic base compounds can be used to solubilize the metal cations. The extraction solvent mixture would be paired with a suitable pervaporation membrane composed of a material permselective to unsaturated compounds. A second example is the use of amines, alone or combined with a carrier fluid, to combine with acid gases such as carbon dioxide or hydrogen sulfide.

Where solvent mixtures are used, there will be an unequal loss of the solvent components through the membranes to the retentate or permeate. In order to correctly balance these losses, the makeup solvent must be proportionately higher in concentration of the components that experience a higher rate of loss.

Additional uses and examples of the device are, of course, possible and the foregoing discussion is not intended to limit the scope of this invention.

What is claimed is:

1. A device for separating chemicals comprising:
   a) a permeate collection tube, consisting of a hollow cylinder provided with at least one row of perforations oriented along the longitudinal axis of the cylinder;
   b) at least one membrane sandwich spirally wound around the permeate collection tube wherein the membrane sandwich comprises:
      (1) a permeate spacer formed by a sheet of mesh;
      (2) a plurality of approximately rectangular pervaporation membranes, each composed of a porous support layer and a relatively thinner, nonporous permselective layer;
      (3) a plurality of solvent spacers, each composed of a sheet of mesh; and;
      (4) a plurality of supported liquid membranes, each consisting of a sheet of solvent, containing microporous hydrophobic membrane with a hydrophilic skin layer;
   c) feed spacers interleaved with said membrane sandwich; and
   d) means to prevent direct mixing of feed retentate, permeate, and solvent.

2. The device of claim 1, wherein the permeate spacer is disposed between two pervaporation membranes, forming a membrane envelope.

3. The device of claim 2, wherein said feed spacers are comprised of approximately rectangular sheets of porous mesh, having an inner and an outer edge, with the inner edge of said feed spacer attached to the permeate collection tube, oriented parallel to said row of said perforations.

4. The device of claim 3, wherein the membrane envelope is disposed between two solvent spacers, forming an intermediate membrane sandwich open on all sides.

5. The device of claim 4, wherein the intermediate sandwich is disposed between two supported liquid membranes, forming a final membrane sandwich with a feed inlet side and a retentate outlet side.

6. The device of claim 5, further comprising impermeable edge wraps which are attached to the feed inlet side and the retentate outlet side of the final membrane sandwich, and to the outer edge of the feed spacers, in order to separate the solvent from the feed and retentate.

7. The device of claim 6, wherein said membrane sandwiches and said feed spacers, after attachment of the impermeable edge wrap, are wound circumferentially around the permeate collection tube, alternating a feed spacer and a membrane envelope, forming a membrane winding assembly having two ends.

8. The device of claim 7, further comprising retention bands that prevent the spirally-wound layers from unwinding.

9. The device of claim 8, further comprising a housing having an inner and an outer wall.

10. The device of claim 9, farther comprising gaskets that are positioned over each end of the membrane winding, such that the gaskets are in contact with the ends of the membrane winding and the inner wall of the housing in order to maintain separation of the feed, retentate, and solvent.

11. The device of claim 10, further comprising an anti-telescoping device at each end of the housing that prevents the membrane layers from telescoping within said housing during operation.

12. The device of claim 11, wherein the housing is cylindrical and has at least one solvent inlet, at least one permeate outlet central to one or both ends, a feed inlet offset from center at one end, and a retentate outlet offset from center at the other end.

13. The device of claim 5, for use in separating and isolating chemicals formed by fermentation means from a dilute aqueous fermentation broth.

14. The device of claim 5, for use in separating and isolating chemicals selected from the group comprised of alcohols, ketones and carboxylic acids.

15. The device of claim 5, for use in separating and isolating volatile organic compounds from wastewaters.

16. The device of claim 5, for use in separating and isolating saturated from unsaturated hydrocarbons, and aromatic from nonaromatic ring compounds.

17. The device of claim 5, in separating and isolating gas mixtures.

* * * * *